Aug. 5, 1958   R. R. WEST   2,845,984
APPARATUS FOR STRAIGHTENING A COTTON PICKER SPINDLE
Filed Nov. 23, 1953
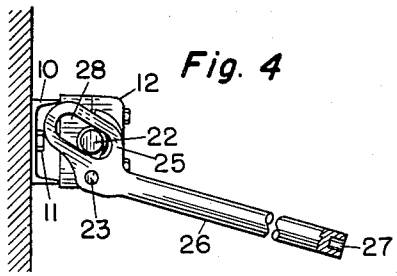
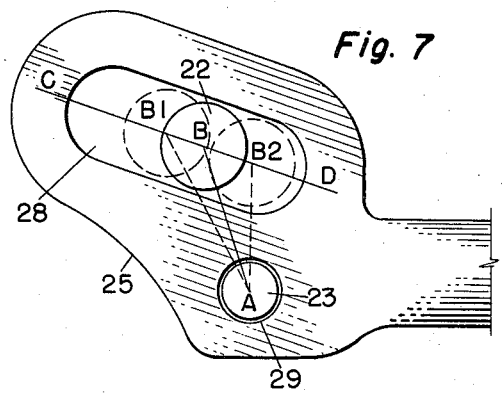
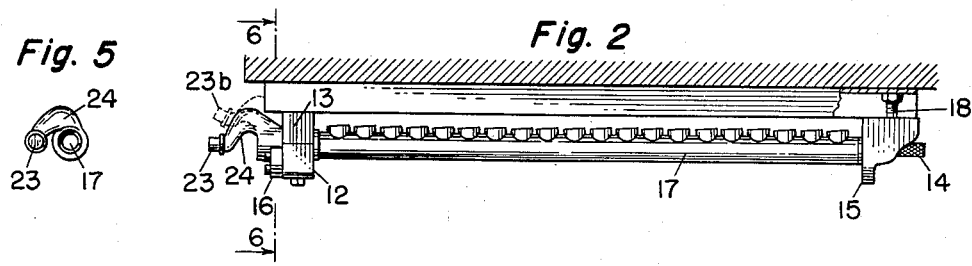
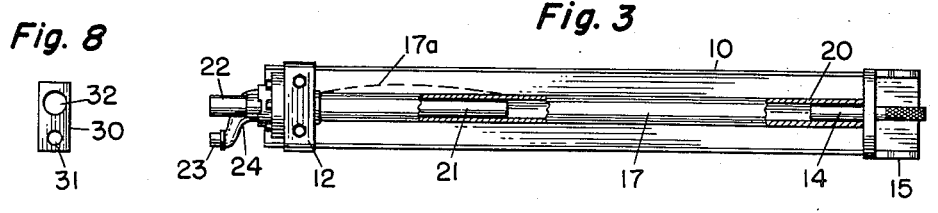
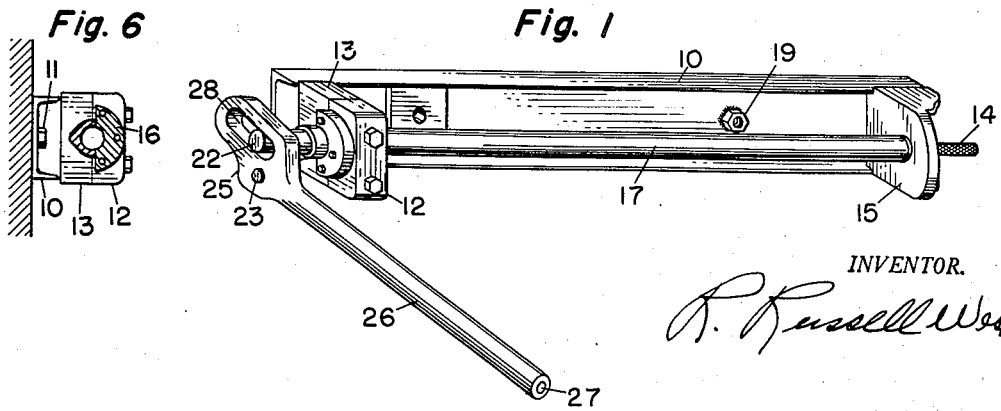
INVENTOR.
R. Russell West

United States Patent Office 2,845,984
Patented Aug. 5, 1958

2,845,984

APPARATUS FOR STRAIGHTENING A COTTON PICKER SPINDLE

R. Russell West, Pine Bluff, Ark., assignor of one-half to J. M. Pittman

Application November 23, 1953, Serial No. 393,631

3 Claims. (Cl. 153—39)

This invention relates to bending tools of the type used to reshape irregular shaped shafts that have been unintentionally deformed in use.

More particularly, the invention relates to a tool to restore distorted cotton picker spindle driving shafts to their original shape after being bent by abnormal strain due to foreign objects clogging the picker spindles and preventing the normal sequence of operation of these spindles. The oscillating motion of these shafts is produced by a cam engaging an eccentric arm located at one end of the shaft. To prevent damage to other, relatively more expensive, parts of the picker, the eccentric arm is heat treated to permit it to bend to disengage the driving cam when the picker spindles are unintentionally stopped. The relatively pliable quality of the steel arm permits reshaping repeatedly without damage to the arm or shaft. A cotton picker employing spindle driving shafts, of the general type that this invention is adapted to recondition, is disclosed in United States Patent No. 2,140,631. The method of attaching the picker spindles to the shaft is disclosed in United States Patent No. 2,497,776. Although my invention does not claim improvements in spindle driving shafts, the principal object of the invention is to provide a tool for restoring such shafts to their original shape within the close tolerances required for proper operation of the shaft in the picker.

Another object of this invention is to provide a tool for bending a machine shaft, having two axes of rotation, so that there will be a predetermined parallel spaced relationship between the two axes.

Another object is to provide a shaft clamping jig for holding the shaft during the bending operation and to serve as a gauge for determining the accuracy of the shaft alignment.

A further object is to provide a tool for the aforementioned purposes that is relatively inexpensive to manufacture, and can be successfully operated by semi-skilled farm laborers.

The above and other objects of the invention will be more apparent from the description and one sheet of accompanying drawings wherein:

Figure 1 is an assembled angle view of the device in one operating position.

Figure 2 is a top view of the clamping jig with a picker spindle driving shaft in the jig. A portion of the base is shown in section.

Figure 3 is a front view of Figure 2 with the straightening mandrel extending into the hollow of the driving shaft. A portion of the shaft is shown in section.

Figure 4 is an end view of Figure 3 with the body portion attached in the operating position. A portion of the handle is shown in section.

Figure 5 is an end view of the spindle driving shaft as it appears from the arm end.

Figure 6 is a view along the line 6—6 of Figure 2 with the shaft locking key shown in section.

Figure 7 is a schematic view of the body portion showing the geometric relationship of the pivot hole to the slot.

Figure 8 is a front view of the gauge block.

Referring to Figure 2 and Figure 3, it will be seen that a picker spindle shaft 17 is held in the clamping jig by the clamping block 12 and the alignment pin 14. The base section 13, of the clamping block 12, is rigidly welded to the base 10. The base 10 is securely held in place by the bolt 11, shown in Figure 4. The tail support 15 is rigidly bolted to the base 10 by the bolt 18. For use with a shorter shaft 17 than that shown in Figure 3, another position is provided by the threaded hole 19 for bolting the tail support 15 to the base 10. If the main body of the shaft 17 is bent in such a manner that the alignment pin 14 which extends through a guide hole in the tail support 15 will not enter the hollow of the shaft 17, pressure is applied to the shaft, near the end 20, in a direction to straighten it so that the tail pin 14 may enter the hollow of the shaft. It is to be noted that this preliminary straightening operation on the shaft 17, may leave a portion of the shaft bent as illustrated by the broken line 17a.

By referring to Figure 3, the method of straightening the shaft 17, when bent as illustrated by the broken line 17a, will be explained. The picker spindle shaft 17 is rigidly held in the clamping jig and the mandrel 21 has been pressed or driven into the hollow of the shaft 17. The mandrel 21 being constructed of hard steel with its outside surface machined to closely fit the inner surfaces of the shaft 17, the shaft 17 is straightened to its operating position by being forced into coaxial relationship with the straight mandrel 21. A projected portion 22, of the mandrel 21, is provided to facilitate insertion of the mandrel into, and removal from, the hollow of shaft 17, and for other purposes hereinafter indicated.

The abnormal strain that results, when the cotton picker is clogged, is transmitted from the spindles, not shown, to the shaft 17, tending to prevent the normal oscillation of the shaft 17 caused by a cam action on the spindle 23. To relieve this strain, that would otherwise cause relatively more damage, the arm 24 is caused to be bent to disengage the pivot 23 from the cam, and the pivot 23 is moved to the position illustrated by the broken lines 23b in Figure 2.

Figure 1 and Figure 4 illustrate the completely assembled tool and the position of the parts when the tool is used to place the arm 24 and the pivot 23 in proper relationship to the shaft 17. The body portion 25 with its attached handle 26 is first removed from the assembly shown in Figure 4 and the pivot socket 27, of the handle 26, is slipped over the pivot while the pivot is in the position indicated by the broken lines at 23b. By using the handle 26 as a lever, the arm 24 is easily bent until the distance between the axis of the pivot 23 and the axis of the shaft 17 is such that the body portion 25 can be reattached to the extended portion 22 of the mandrel and to the pivot 23 as shown in Figure 4.

After completing the operation described first above, the extended portion 22 of the mandrel will extend into the slot 28, but in a random lateral position. For proper operation of the shaft in the picker, the distance from the axis of the pivot 23 to the axis of the shaft 17 is limited to a tolerance of 0.007 inch by the manufacturer. Referring again to Figure 4, if it is found that the distance between the axes is incorrect the body portion 25 is manually rotated about the pivot 23, by means of the handle 26, to change the distance between the axes. The shaft 17 is restrained from rotation by the locking key 16 that engages the walls of the shaft that are exposed by a slot in the periphery of the shaft as shown in Figure 6. The slot is provided for keying the shaft to the picker mechanism. The rotation of the body portion 25 on the axis 23 results in changing the distance from the axis of the pivot to the axis of projected portion 22 of the mandrel 21, which is coaxial with the shaft 17, because of the unique spaced relationship of the slot 28 with respect to the pivot hole 29. This relationship will be explained by considering the geometry of Figure 7.

In Figure 7, the body portion 25 is shown attached to a pivot 23 that is in correct relationship to the axis of an undistorted shaft. The end view of such a shaft is shown in Figure 5. When this correct relationship exists the extended portion 22 of the mandrel will be positioned in the slot 28 is indicated by the circle with its center at B. In the normal operation of cotton pickers the clogging of the picker spindles results in distorting the arm 24 and moving the pivot 23 in a counterclockwise direction, as viewed in Figure 5, about the shaft 17. The arm 24 has a normal curved shape and this distortion tends to straighten it, and the distance from the axis of the pivot 23 to the axis of the shaft 17 will be increased as indicated, for one particular condition, by the broken line A—B1, and the extended portion 22 of the mandrel will take a position in the slot as represented by the broken line circle with its center at B1. To return the pivot 23 to its proper relationship to the shaft 17, the body portion 25 is rotated in a counterclockwise direction until the relative position of the pivot 23 with respect to the extended portion 22 of the mandrel is normal, as represented by the circle with its center at B. The line A—B represents the normal distance between the axis of the pivot 23 and the axis of the shaft 17.

As stated above, the arm 24 is usually distorted in a direction to increase the distance from A to B in Figure 7. However, there are many of these, relatively expensive shafts, with the arm 24 distorted so that the distance from the axis of the pivot 23 to the axis of shaft 17 is less than normal, as indicated by the broken line A—B2. Such distortion has usually been caused by attempts to recondition shafts with special presses and other tools that have heretofore been available. When the arm 24 has been distorted, as just described, it can be easily reconditioned by a clockwise rotation of the body portion 25. I have found by repeated experiments that for reconditioning picker spindle driving shafts, of the shape now being used, my tool operates most satisfactorily when the relationship of the slot 28 to the pivot hole 29 is such that the angle ABD, in Figure 7, is sixty degrees.

Still referring to Figure 7, the inner side walls of the slot 28 are parallel to the inner wall of the pivot hole 29. During the bending or straightening operation, as heretofore explained, considerable force is exerted to force the side of the slot to a parallel abutting relationship to the extended portion 22 of the mandrel 21, thus holding the axis of the pivot hole 29 in parallel relationship to the axis of the mandrel 21, and thus to the axis of the shaft 17. In a similar manner a force is applied to the pivot 23 to produce parallel abutting relationship between the pivot 23 and the wall of the pivot hole 29. In the manner just described, the axis of the pivot 23 is forced into parallel relationship with the axis of the shaft 17.

I have discovered, that with some practice in operating this tool manually, the operator can determine, by the change in the force required to rotate the body portion 25, when the pivot 23 is in satisfactory alignment with the shaft 17. To check this alignment, the gauge shown in Figure 8, is provided. This gauge consists of the main body 30 with the hole 31, and the relatively larger hole 32, in spaced relationship in the body 30. The axis of the hole 31 is parallel to the axis of the hole 32. When the axis of the pivot 23 is the correct distance from, and in correct alignment with, the axis of the shaft 17, the pivot 23 and the extended portion 22, of the mandrel 21, will slip into the holes 32 and 31 respectively. The degree of accuracy obtained by using my bending tool is indicated by the fact that many of these tools are now in successful use and a gauge block is used with the distance between the axis of the hole 31 and the axis of the hole 32 held to a tolerance of 0.002 inch. No difficulty has been encountered in reshaping deformed cotton picker spindle driving shafts so that they will come within this tolerance. It is common practice for semi-skilled farm laborers to successfully operate my bending tool.

Although the invention has herein been described in considerable detail, it is to be understood that such description is intended as illustrative rather than limiting.

I claim:

1. An apparatus for reshaping a distorted tubular cotton picker spindle driving shaft having a pivot arm extending radially from one end thereof and a pivot extending laterally from the end of said arm; a jig for holding the shaft to prevent rotation thereof comprising a mounting base, a clamp rigidly attached to one end of the base and a support rigidly attached to the other end of the base, a guide hole extending through said support, an alignment pin extending through the guide hole and adapted to extend into the hollow of the shaft when the shaft is secured by said clamp; a mandrel adapted to extend coaxially into the opposite end of the shaft from the guide pin with a portion of the mandrel projecting from the hollow of the shaft to form a journal and a bending member formed with a pivot hole for reception of said pivot and with a spaced non-concentric cam slot designed and arranged to receive said journal when the pivot hole is placed over said pivot.

2. An apparatus for reshaping a distorted cotton picker spindle driving shaft of the type having a longitudinal bore, a pivot arm extending radially from one end of the shaft, and a pivot extending laterally from the end of said arm; said apparatus comprising a clamping jig for holding such a shaft to prevent rotation thereof, a mandrel adapted to extend coaxially into the bore of such a shaft with a portion of the mandrel projecting from the pivot arm end of the shaft, to form a journal, and a body portion formed with a pivot hole for reception of said pivot and with a spaced non-concentric cam slot designed and arranged to receive said journal when the pivot hole is placed over said pivot and means including a handle rigidly attached to said body portion for rotating the body portion about said pivot in a plane normal to the axis of said mandrel and bending said arm to move the pivot in the direction of rotation of said body portion and simultaneously forcing the engagement of a lateral wall of said slot with said projected portion of the mandrel to bend said arm in a direction normal to said plane.

3. An apparatus for reshaping a distorted tubular cotton picker spindle driving shaft of the type having a pivot arm extending radially from one end thereof and a pivot extending laterally from the end of said arm, said apparatus comprising a clamping jig for holding said tubular shaft, a rigid mandrel adapted to extend coaxially into said shaft with a portion of the mandrel projecting from the pivot arm end of the shaft to form a journal, a body portion with a pivot hole and a slot in spaced relationship, the lateral walls of the slot being parallel to the axis of the pivot hole, said pivot hole being adapted to receive said pivot and said slot being adapted to receive said journal, the position of said slot with respect to said pivot hole being such that a rotary motion of said body portion on the pivot will bend said arm in the direction of rotation to change the distance from said mandrel to the pivot without moving said journal, and means including a handle rigidly attached to said body portion for rotating said body portion about said pivot.

References Cited in the file of this patent

UNITED STATES PATENTS

| | | |
|---|---|---|
| 1,431,708 | Tisdale | Oct. 10, 1922 |
| 2,219,191 | Merrill et al. | Oct. 22, 1940 |
| 2,635,668 | Redinbaugh | Apr. 21, 1953 |
| 2,635,669 | Worthington | Apr. 21, 1953 |